(12) United States Patent
Erdmenger et al.

(10) Patent No.: US 11,814,988 B2
(45) Date of Patent: Nov. 14, 2023

(54) TURBOMACHINE AND SYSTEM FOR COMPRESSOR OPERATION

(71) Applicants: General Electric Company, Schenectady, NY (US); General Electric Company Polska Sp. z o. o., Warsaw (PL)

(72) Inventors: Rodrigo Rodriguez Erdmenger, Kleinberghofen (DE); Rudolph Selmeier, Fahrenzhausen (DE); Mehdi Milani Baladi, Cincinnati, OH (US); Jacek Marian Elszkowski, Tczew (PL)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 17/475,585

(22) Filed: Sep. 15, 2021

(65) Prior Publication Data

US 2022/0090507 A1 Mar. 24, 2022

(30) Foreign Application Priority Data

Sep. 22, 2020 (PL) .......................... 435395

(51) Int. Cl.
*F01D 9/04* (2006.01)
*F01D 17/10* (2006.01)

(52) U.S. Cl.
CPC ............ *F01D 9/041* (2013.01); *F01D 9/045* (2013.01); *F01D 17/105* (2013.01); *F05D 2240/12* (2013.01); *F05D 2260/606* (2013.01)

(58) Field of Classification Search
CPC ..... F01D 9/00; F01D 9/02; F01D 9/04; F01D 9/041; F01D 9/045; F01D 9/06; F01D 17/14; F01D 17/141; F02C 3/08; F02C 3/13; F02C 6/08; F02C 9/18; F05D 2260/606; F05D 2240/12; F05D 2270/101; F04D 27/023; F04D 17/025
See application file for complete search history.

(56) References Cited

U.S. PATENT DOCUMENTS

| | | | |
|---|---|---|---|
| 4,640,091 A * | 2/1987 | Blizzard | F01D 17/105 60/795 |
| 4,720,235 A | 1/1988 | Lachance et al. | |
| 6,435,816 B1 | 8/2002 | Czachor | |
| 6,832,893 B2 | 12/2004 | Chevrefils et al. | |
| 6,908,278 B2 | 6/2005 | Brunet et al. | |
| 9,726,084 B2 | 8/2017 | Duong et al. | |
| 9,909,494 B2 | 3/2018 | Roberge | |

(Continued)

FOREIGN PATENT DOCUMENTS

| | | |
|---|---|---|
| EP | 3061975 A1 | 8/2016 |
| WO | 2012030776 A2 | 3/2012 |

*Primary Examiner* — Elton K Wong
(74) *Attorney, Agent, or Firm* — Fitch, Even, Tabin & Flannery LLP

(57) ABSTRACT

A turbomachine defining a flowpath therethrough at which a fluid is compressed is provided, in which the turbomachine includes a first compressor in serial flow arrangement upstream of a second compressor. The second compressor includes a port at the flowpath and is configured to receive at least a portion of the fluid from the flowpath from the second compressor. The first compressor includes a vane positioned at the flowpath and the vane includes an opening at the flowpath configured to egress the portion of the fluid from the port into the flowpath.

19 Claims, 9 Drawing Sheets

(56) References Cited

U.S. PATENT DOCUMENTS

| | | |
|---|---|---|
| 10,054,051 B2 | 8/2018 | Foutch et al. |
| 10,087,764 B2 | 10/2018 | Rockarts et al. |
| 2004/0081552 A1* | 4/2004 | Guemmer ............. F04D 29/542 |
| | | 415/112 |
| 2006/0104805 A1 | 5/2006 | Gummer |
| 2009/0158739 A1 | 6/2009 | Messmer |
| 2009/0271094 A1 | 10/2009 | Stablein et al. |
| 2010/0111688 A1* | 5/2010 | Nolcheff ............... F04D 27/023 |
| | | 415/224 |
| 2013/0017066 A1* | 1/2013 | Nolcheff .................. F02C 9/18 |
| | | 415/169.1 |
| 2014/0321987 A1* | 10/2014 | Nolcheff ................ F01D 9/041 |
| | | 415/148 |
| 2016/0312799 A1* | 10/2016 | Yu ......................... F04D 29/667 |
| 2016/0333794 A1 | 11/2016 | Baladi et al. |
| 2018/0355738 A1* | 12/2018 | Vitt ......................... F01D 5/145 |
| 2018/0355877 A1 | 12/2018 | Donnelly et al. |
| 2019/0024527 A1 | 1/2019 | Skertic |

\* cited by examiner

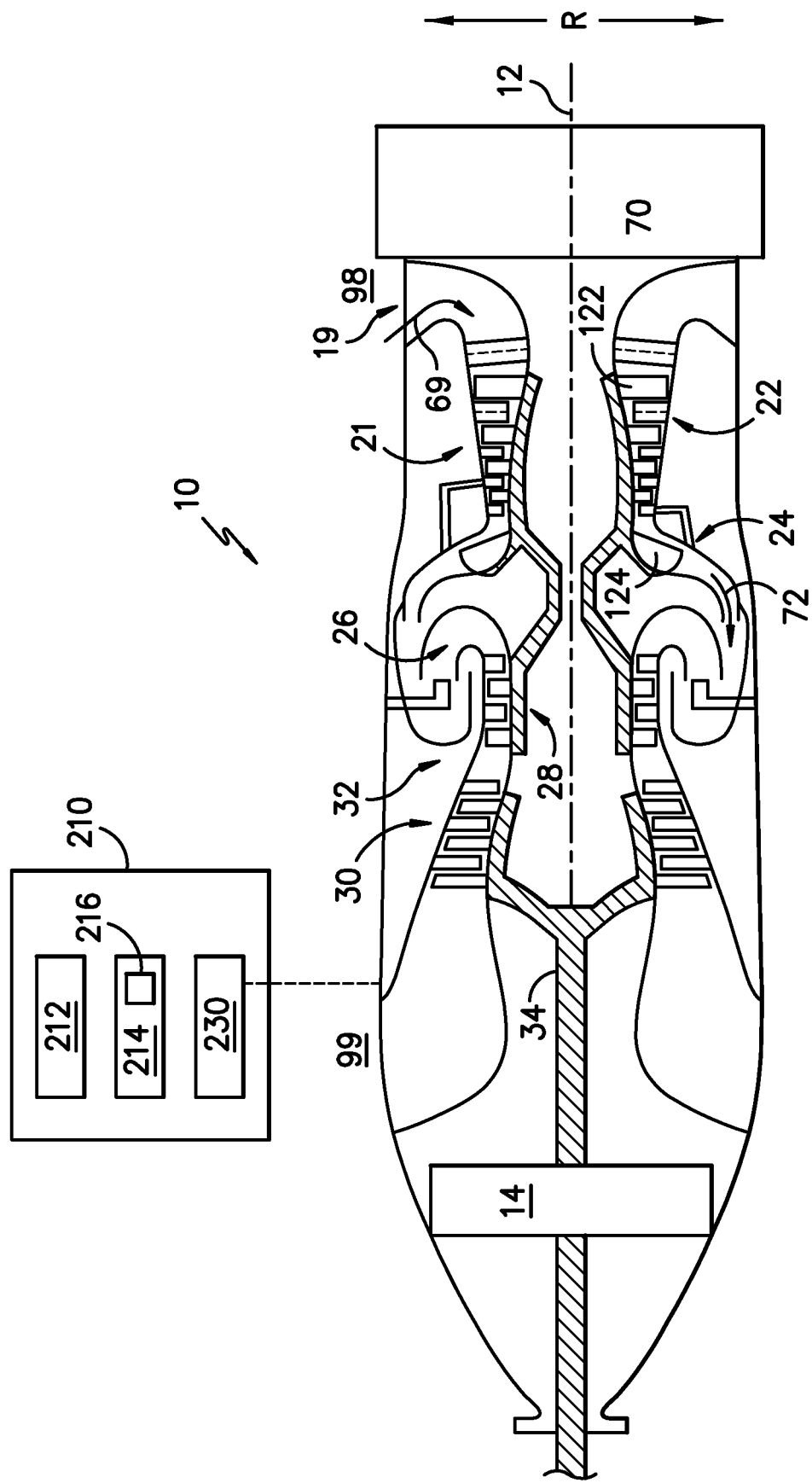
FIG. -1-

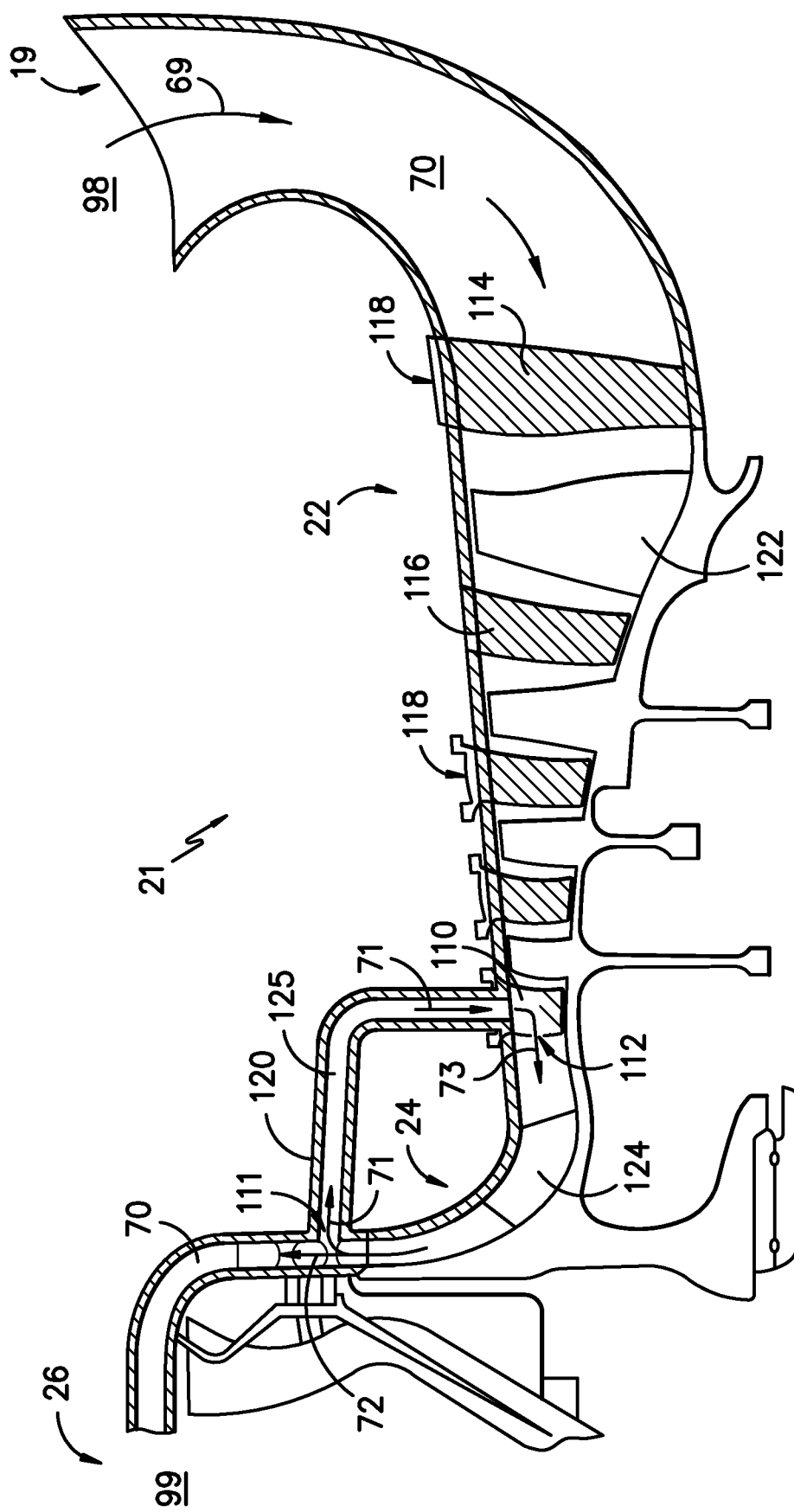
FIG. -2-

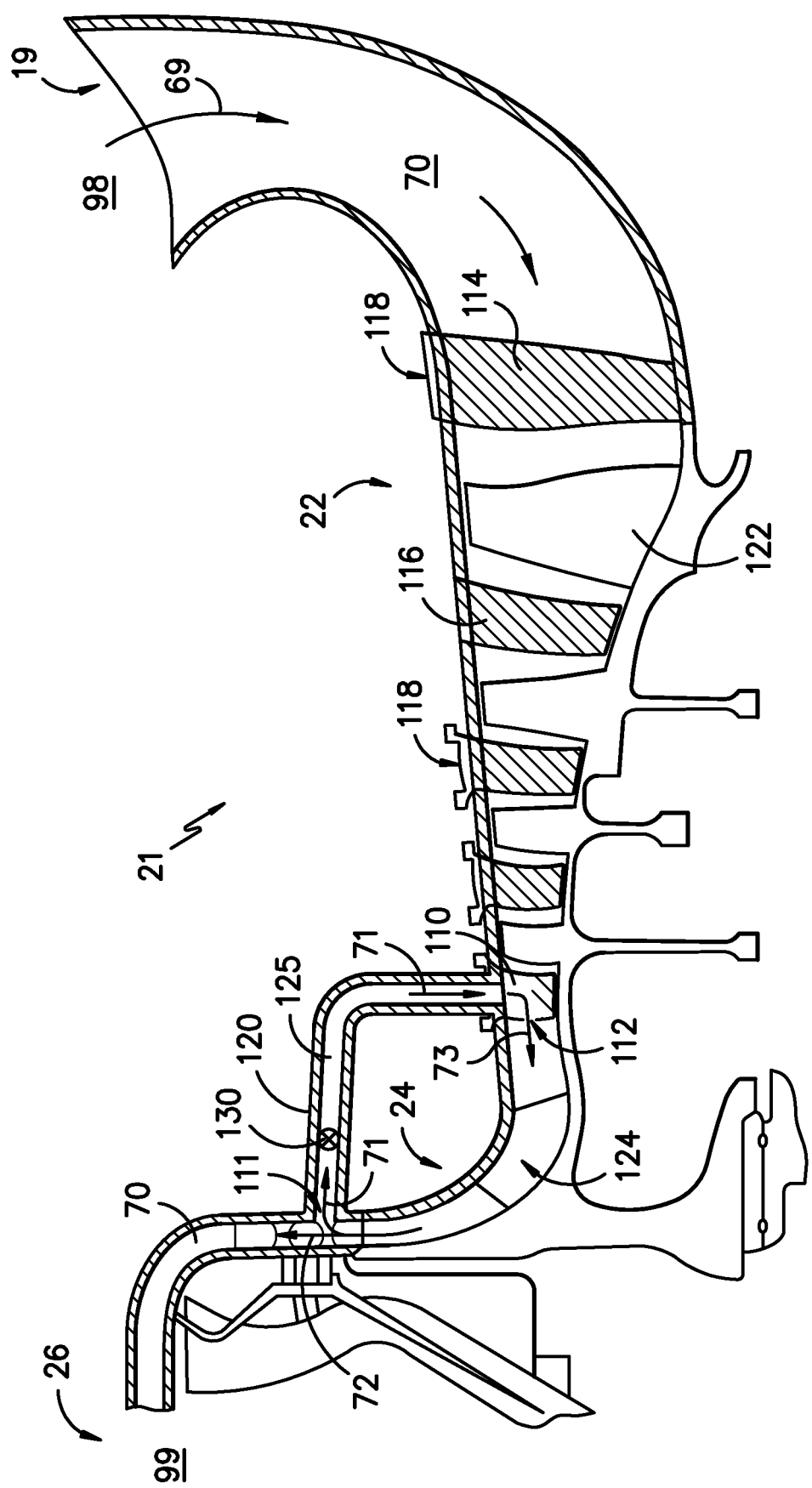
FIG. -3-

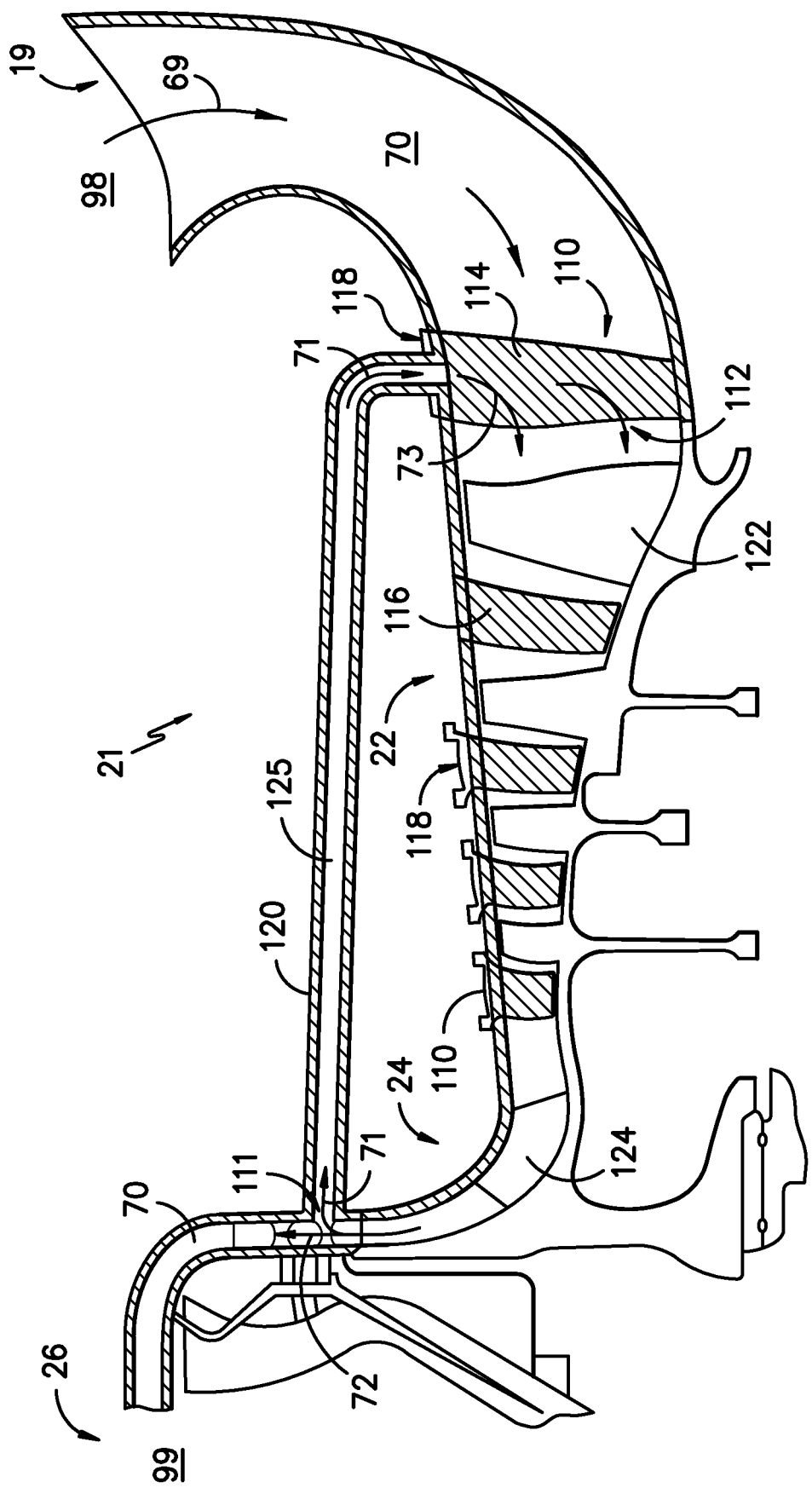
FIG. -4-

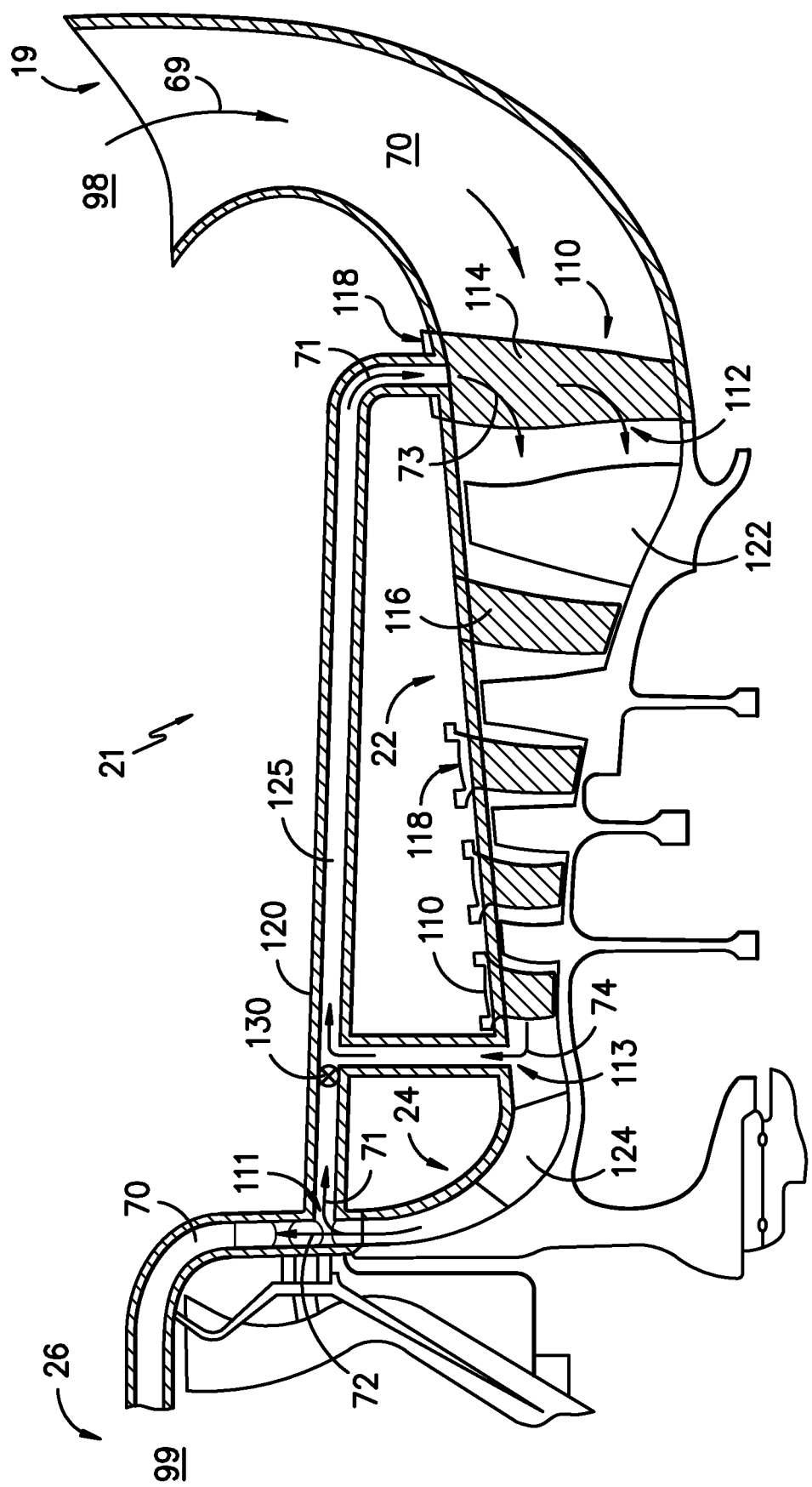
FIG. -5-

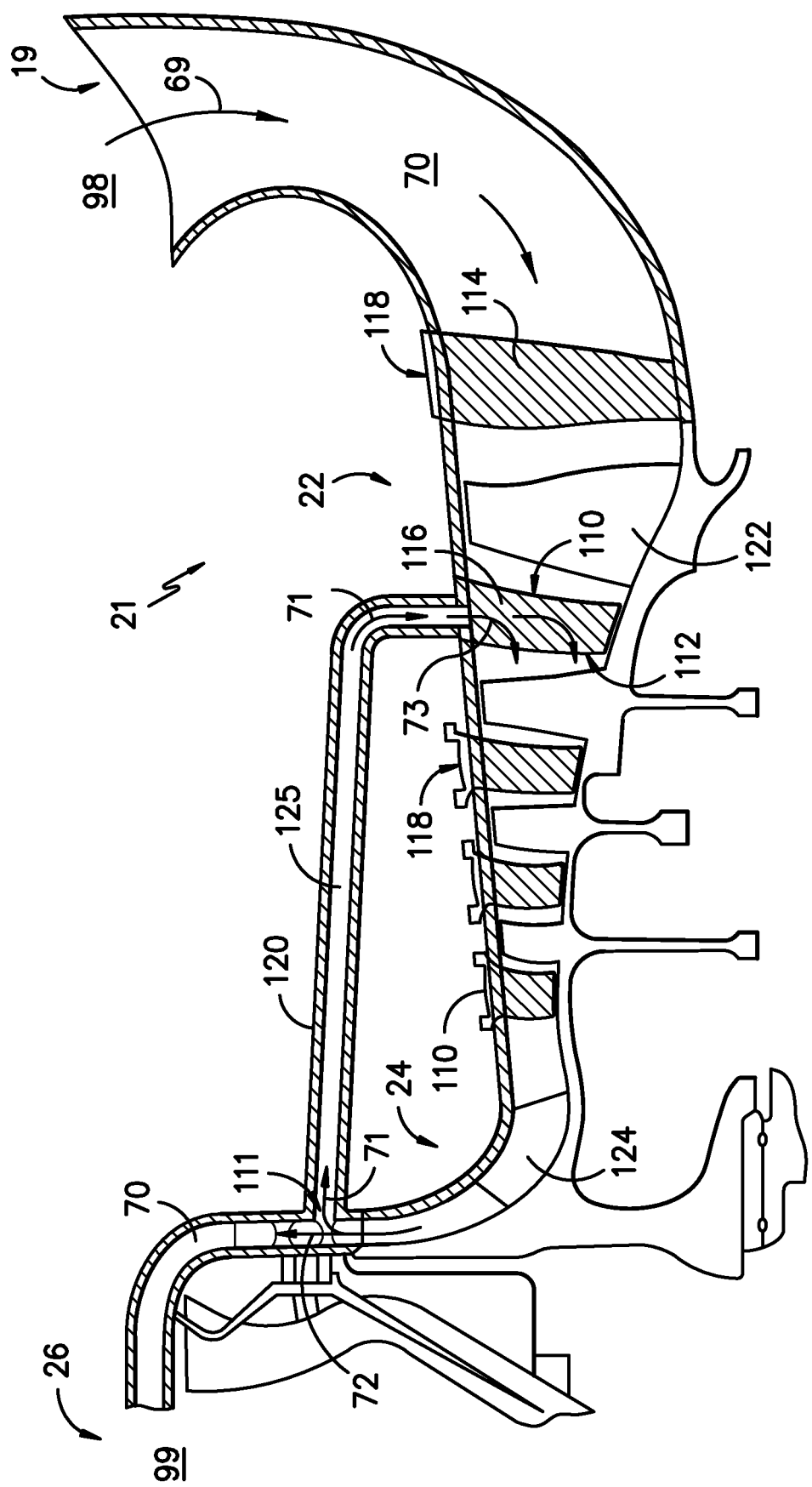
FIG. -6-

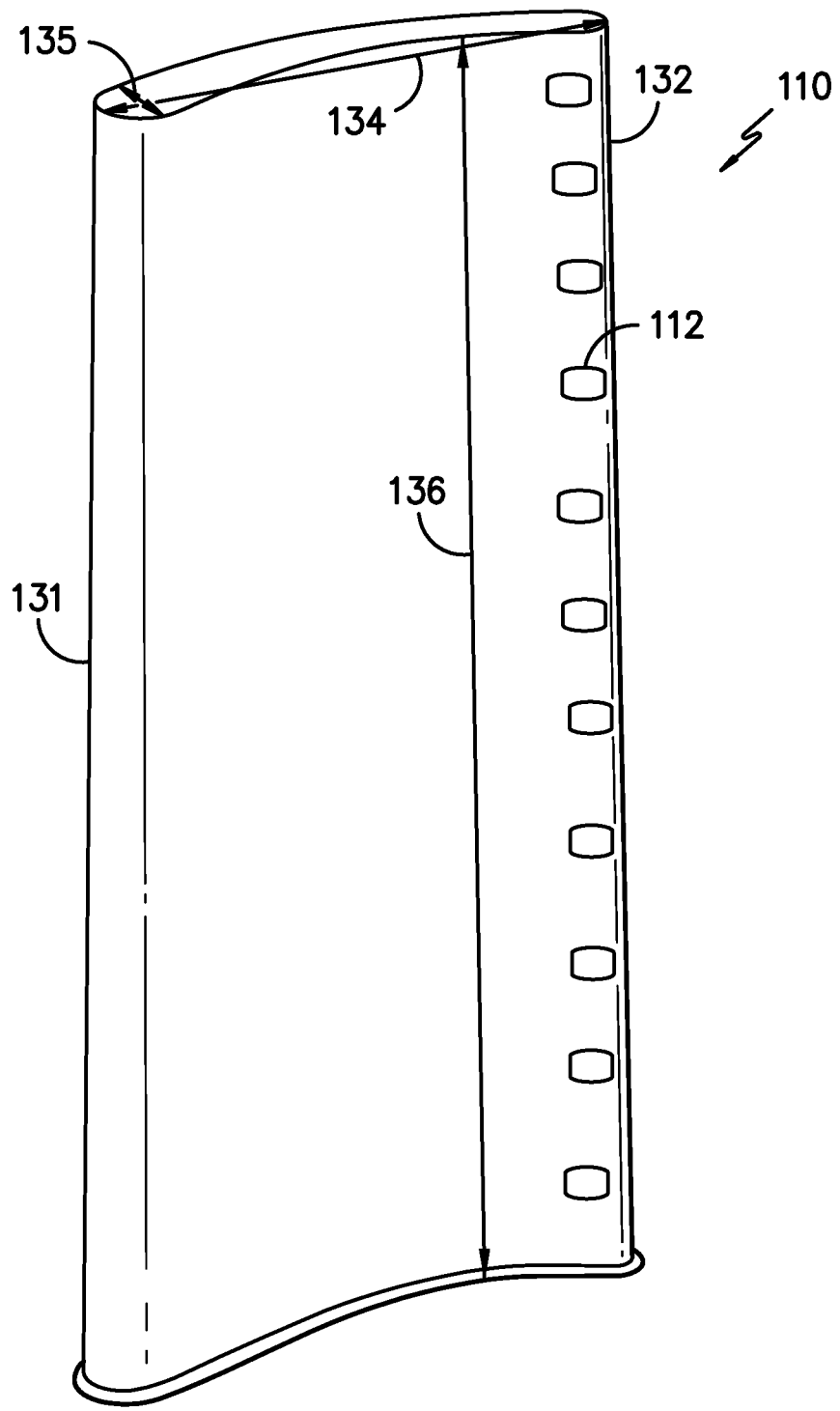
FIG. -7-

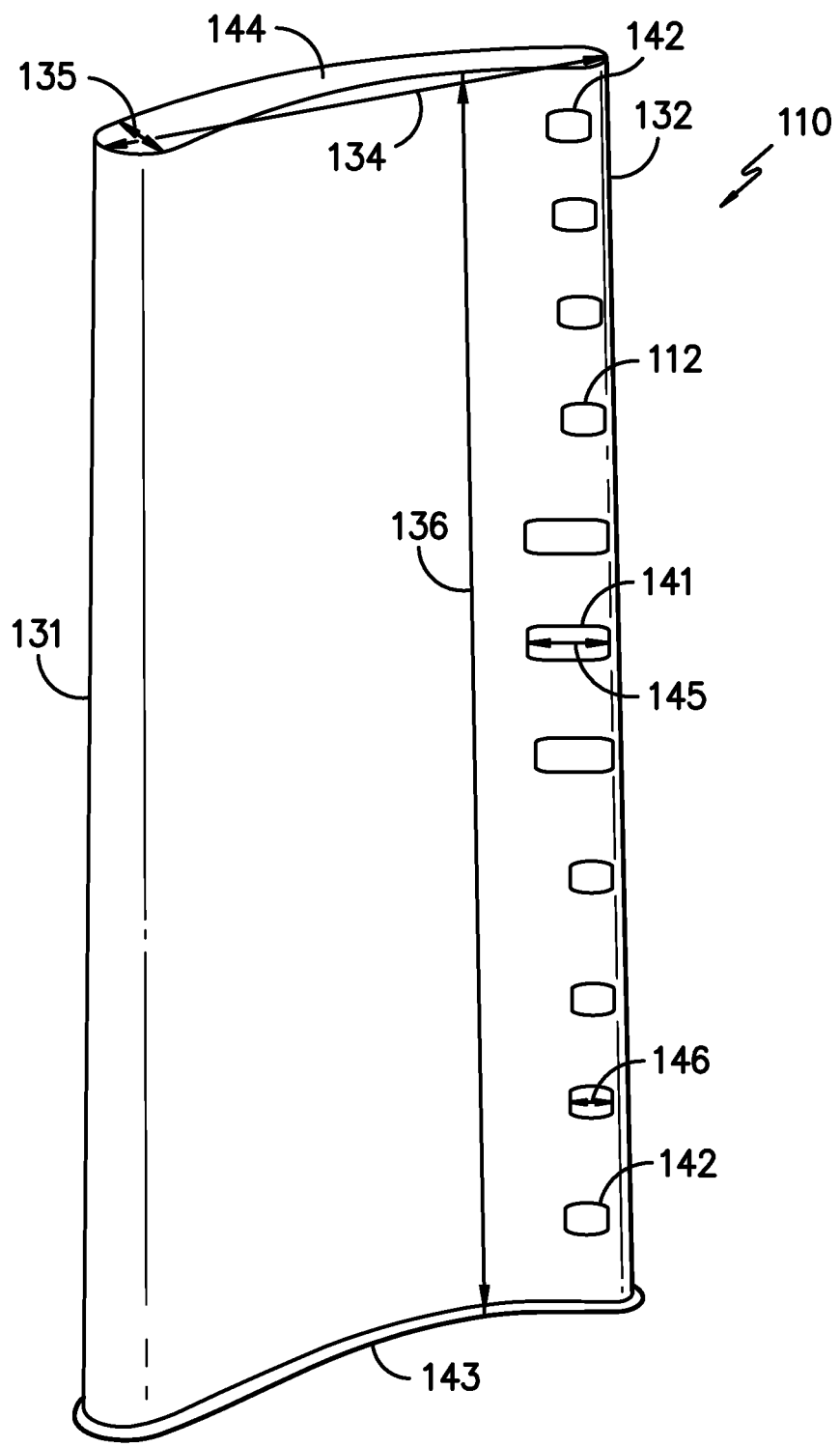
FIG. -8-

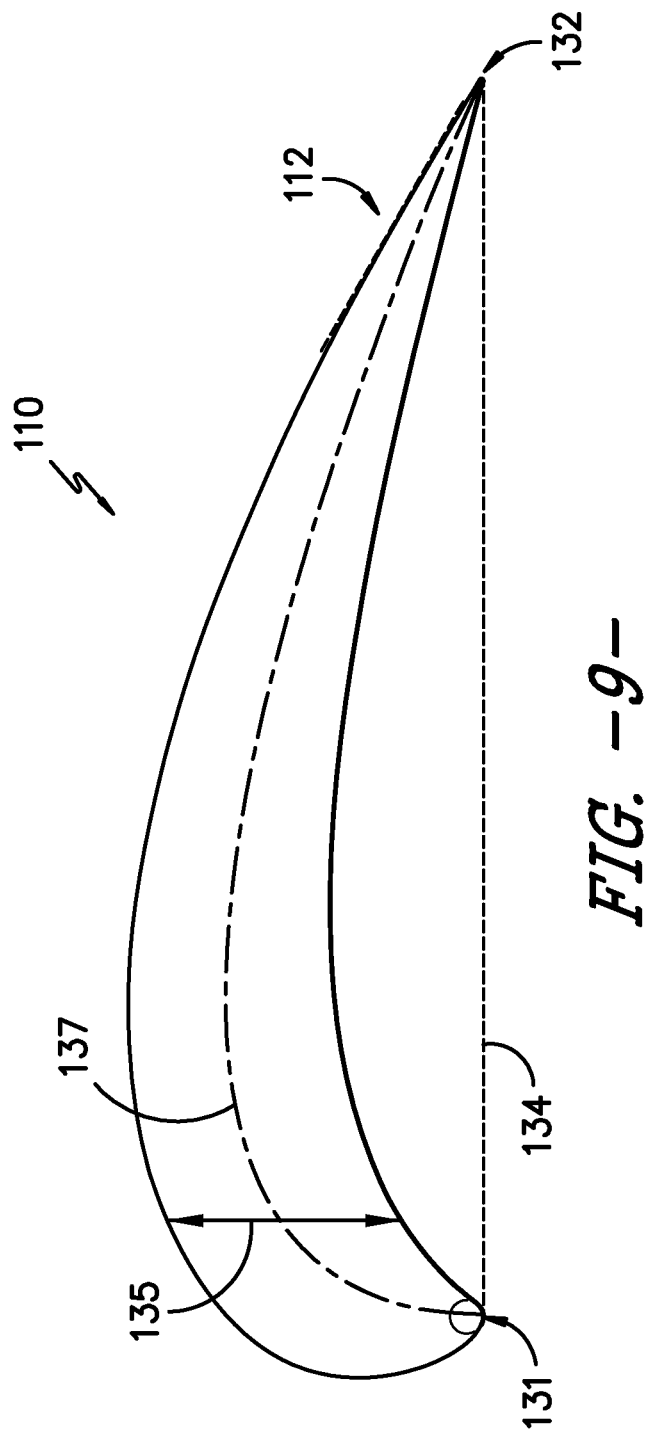
FIG. -9-

TURBOMACHINE AND SYSTEM FOR COMPRESSOR OPERATION

FIELD

The present subject matter relates generally to turbomachines and systems for compressor operation for improved compressor operability or performance. The present subject matter relates particularly to compressor assemblies for turbine engines and systems for directing fluid flow.

BACKGROUND

Turbomachines, such as gas turbine engines, generally include two or more compressors to produce pressurized air for generating combustion gases to operate a turbine section. It is a general requirement for turbomachine design to improve compressor operability and performance, such as an ability of a compressor section to increase pressure ratio across a plurality of stages, and an ability for the compressor section to do so without compressor stall or surge.

Known solutions for improving compressor operability and performance include variable vane architectures, such as variable guide vanes, variable inlet guide vanes, or inter-stage bleed ports that remove compressed air from the compressor flowpath. These architectures may generally include actuators, torque boxes, devises, synchronization rings, or other hardware to rotate the vane angle to affect compressor flow.

Variable vane architectures generally affect compressor operability and performance while also adding engine weight via the associated hardware to rotate the vane angle. Structures that increase engine weight are generally balanced against their improvements to the overall engine. Structures that increase engine weight may become more prohibitive as the engine size or power output decreases. As such, there is a need for structures and methods for improving compressor operability and performance while mitigating or eliminating adverse effects to the overall engine. Furthermore, there is a need for structures and methods for improving compressor operability and performance while mitigating or eliminating increases in engine weight at turboshaft and turboprop engines.

BRIEF DESCRIPTION

Aspects and advantages of the invention will be set forth in part in the following description, or may be obvious from the description, or may be learned through practice of the invention.

Aspects of the disclosure are directed to a turbomachine defining a flowpath therethrough at which a fluid is compressed is provided. The turbomachine includes a first compressor in serial flow arrangement upstream of a second compressor. The second compressor includes a port at the flowpath and is configured to receive at least a portion of the fluid from the flowpath from the second compressor. The first compressor includes a vane positioned at the flowpath and the vane includes an opening at the flowpath configured to egress the portion of the fluid from the port into the flowpath.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of an exemplary embodiment of a turbomachine engine according to an aspect of the present disclosure;

FIG. 2 is a schematic cross-sectional view of a portion of an embodiment of an engine such as depicted and described in regard to FIG. 1;

FIG. 3 is a schematic cross-sectional view of a portion of an embodiment of an engine such as depicted and described in regard to FIG. 1;

FIG. 4 is a schematic cross-sectional view of a portion of an embodiment of an engine such as depicted and described in regard to FIG. 1;

FIG. 5 is a schematic cross-sectional view of a portion of an embodiment of an engine such as depicted and described in regard to FIG. 1;

FIG. 6 is a schematic cross-sectional view of a portion of an embodiment of an engine such as depicted and described in regard to FIG. 1;

FIG. 7 is a perspective view of an exemplary vane of the compressor section of FIGS. 2-6 according to aspects of the present disclosure;

FIG. 8 is a perspective view of an exemplary vane of the compressor section of FIGS. 2-6 according to aspects of the present disclosure; and FIG. 9 is a cross-sectional airfoil view of an exemplary vane of the compressor section of FIGS. 2-6 according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a turbomachine and compressor section according to aspects of the present disclosure are provided. The turbomachine and compressor section depicted and described herein may generally improve or increase compressor operability and performance. Structures and methods provided herein may allow for improved compressor operability and performance while mitigating or eliminating increases in engine weight. Such improvements may allow for desired effects relative to adjusting vane exit angles without the hardware generally associated with variable vane architectures. Structures and methods provided herein allow for improved operability and performance at compressor sections for relatively small gas turbine engines, such as turboshaft and turboprop engines, while reducing or eliminating hardware generally associated with variable vane architectures, and associated weight gain to the overall engine.

Adverse effects of increased engine weight with regard to variable vane architectures may be particularly large with regard to turboshaft and turboprop engines versus turbofan engines. As such, variable vane architectures at turboshaft and turboprop engines may result in relatively large weight gains relative to compressor operability and performance improvements. Such weight gains may result in variable vane architectures having prohibitive overall engine performance losses relative to compressor section improvements for turboshaft or turboprop engines.

Furthermore, or alternatively, variable vane architectures generally may be limited in their ability to affect compressor operating conditions. For instance, variable vane structures are often linked together, such that variation of vane angle at one stage of vanes also affects the vane angle at another stage. In another instance, variable vane structures may be limited to affecting compressor operating conditions at part-power operation, rather than full-power operation. In still another instance, inter-stage bleed ports often remove energy from the thermodynamic flowpath, resulting in loss of energy that may be provided to the combustion section for generating combustion gases.

Structures and methods depicted and described herein provide improved operability and performance via particular ports at the compressor flowpath and conduits to desirably re-direct the compressed fluid upstream to egress through openings at one or more stages of vanes. Improved operability and performance provided herein may include increased pressure ratio across a plurality of compressors, and an ability for the compressor section to increase pressure ratio without compressor stall or surge. Embodiments of the turbomachine and compressor section herein provide structures and methods for utilizing at least a portion of compressed fluid from a downstream compressor and re-routing the compressed fluid back to the compressed fluid flowpath at an upstream compressor, such as to desirably control vane exit angle of fluid from the upstream compressor and desirably match operability and performance of the upstream and downstream compressors.

Structures and methods provided herein include unexpected improvements to compressor section structure and operation. For instance, unexpected improvements may include increasing loading at the downstream compressor to improve compressor matching with the upstream compressor.

Additionally, or alternatively, structures and methods provided herein may provide improvements that are particular to relatively small gas turbine engines, such as turboprop or turboshaft engines, in contrast to larger turbofan engines. In certain embodiments, structures and methods provided herein may provide improvements for turboprop or turboshaft engines providing less than approximately 2000 shaft horsepower output. Structures and methods provided herein may remove or obviate a need or desire for variable geometry airfoils and associated kinematic hardware at a compressor section, allowing for significant reductions in engine weight and size versus power output. Additionally, structures and methods provided herein may improve compressor section operability and performance across all or substantially all of an operating envelop, in contrast to systems that may be limited to part-power conditions or full-power conditions. Furthermore, or alternatively, structures and methods provided herein may allow for higher-temperature operation and/or higher-altitude operation of a compressor section associated with turboprop or turboshaft engines.

Referring now to the drawings, FIG. 1 is an exemplary schematic cross-sectional embodiment of a turbomachine engine 10 (hereinafter, "engine 10") according to aspects of the present disclosure. Embodiments of the engine 10 provided herein may be configured as a turboshaft or turboprop gas turbine engine or gas generator. The engine 10 defines a radial direction R extended from an axial centerline axis 12. The engine 10 includes a compressor section 21 in serial flow arrangement with a combustion section 26 and a turbine section 32. As described below, the compressor section 21 includes a first compressor 22 in serial flow arrangement upstream of a second compressor 24. In certain embodiments, the first compressor 22 is an axial compressor including a plurality of rows or stages of blades 122 and the second compressor 24 is a centrifugal compressor including a rotatable impeller 124. The compressor section 21 receives an initial flow of fluid, such as an oxidizer, through an inlet 19 and provides a compressed fluid to the combustion section 26. The combustion section 26 mixes the compressed fluid with a liquid and/or gaseous fuel and burns the mixture to generate combustion gases. The combustion gases flow downstream to the turbine section 32. The turbine section 32 generally includes a first turbine 28 operably coupled to the compressor section 21, such as to provide a driving force for rotation of the first compressor 22 and/or second compressor 24.

The turbine section 32 generally includes a second turbine 30 operably coupled to a load device 14. In certain embodiments, a shaft 34 is operably coupled to the second turbine 30, such as to transmit power or torque from the second turbine 30 to the load device 14. In various embodiments, the engine 10 may include a plurality of the load device 14. In still various embodiments, the load device 14 includes a propeller assembly, a fan assembly, a driveshaft, a gear assembly, a drive mechanism, an electric machine (e.g., motor and/or generator, or hybrid-electric system), or combinations thereof. Fan or propeller assemblies may include one or more pitch-change mechanisms. It should be appreciated that the engine 10 may be configured as a propulsion system for a rotary wing or fixed wing aircraft, a land-based vehicle, or sea-based vehicle, or combinations thereof. The engine 10 may additionally, or alternatively, be configured as a power generation system, such as an auxiliary power unit, an industrial gas turbine engine, a hybrid-electric power system, or other desired power system.

Furthermore, although depicted as a reverse-flow turbomachine, it should be appreciated that the engine 10 and/or compressor section 21 provided may be configured as a straight-flow or other appropriate turbomachine configuration.

Various aspects of the engine 10 provided in regard to FIG. 1 may include any desired type of combustion section 26, such as, but not limited to, one or more types of deflagrative combustion systems, such as, but not limited to, trapped vortex combustors, scroll or volute combustors, can or can-annular, or annular combustors, and/or one or more types of detonation combustors (e.g., pulse detonation, rotating detonation, etc.), or other desired combustor configuration, or generally a heat- or energy-addition assembly.

Still various aspects of the engine 10 may include inter-digitated rotor structures, such that rows or stages of blades from separately rotatable structures are in alternating arrangement with one another across a fluid flowpath.

Referring now to FIGS. 2-6, cross-sectional views of embodiments of a portion of the engine 10 are provided. As described above, the engine 10 includes a flowpath 70 through which a fluid is compressed. A fluid, such as an oxidizer, or a compressible fluid generally, enters the compressor section 21 from an inlet 19, such as depicted via arrows 69. The engine 10 includes a first compressor 22 in serial flow arrangement upstream of a second compressor 24. In certain embodiments, the first compressor 22 and the second compressor 24 are each commonly rotatable with one another. In one embodiment, the first compressor 22 is an axial compressor. In various embodiments, the second compressor 24 is a centrifugal compressor. For instance, the first compressor 22 defining an axial compressor may be positioned upstream and co-rotational with the second compressor 24 defining a centrifugal compressor. Embodiments of compressor sections with axial and centrifugal compressors may be applied generally to relatively small gas turbine engines. However, it should be appreciated that in other embodiments the first and second compressors 22, 24 may be any suitable combination of compressor types and/or separately rotatable relative to one another.

Referring back to FIGS. 2-6, the first compressor 22 and the second compressor 24 each compress the fluid, such as depicted via arrows 72. The second compressor 24 includes a port 111 through which at least a portion of the compressed fluid 72 egresses from the flowpath 70, such as depicted via arrows 71. The port 111 at the second compressor 24 is configured to receive at least the portion of the fluid 71 from the flowpath 70 from the second compressor 24.

The first compressor 22 includes a vane 110 positioned at the flowpath 70 at which an opening 112 is formed. The opening 112 is at the flowpath 70 such as to egress at least a portion of fluid 71 from the port 111 into the flowpath 70 via the opening 112 at the vane 110, such as depicted via arrows 73.

In various embodiments, the port 111 at the second compressor 24 is positioned at or aft of a downstream end 99 of the second compressor 24. For instance, the downstream end 99 of the second compressor 24 may correspond to Station 3, or downstream, of a turbomachine, such as a gas turbine engine. Fluid, such as oxidizer or air, bled from the second compressor 24 is utilized to desirably affect compressor matching between the first compressor 22 and the second compressor 24, such as to improve or increase operability margin of the compressor section 21. In particular embodiments, the port 111 is configured as a bleed port to increase operability margin during high-temperature conditions at or entering the compressor section 21. In still particular embodiments, the increased operability margin allows for increased operational altitude (e.g., lower pressure of the fluid 69 entering the compressor section 21) or increased operational range.

The port 111 provides at least a portion of the fluid 71 from the second compressor 24, or downstream thereof, to the flowpath 70 at the first compressor 22 via the opening 112 at the vane 110. The fluid 73 re-entering the flowpath 70 from the vane 110 desirably alters a work split between the first compressor 22 and the second compressor 24. The fluid 73 re-entering the flowpath 70 may desirably alter work split between the compressors 22, 24 by varying an exit angle of a flow of fluid from the static or stationary vane. Particularly, the flow of fluid 73 egressed from the opening 112 may desirably alter the work split without the use of kinematic hardware, such as actuators, torque boxes, devises, synchronization rings, or other hardware to rotate the vane angle to affect compressor flow. Additionally, the arrangement of ports, conduits, and openings may desirably alter the work split for a commonly rotatable compressors in contrast to separately rotatable compressors.

As such, in various embodiments, the vane 110 is a stationary, non-rotating, or otherwise fixed airfoil of the compressor section 21. In still various embodiments, other vanes 118 of the compressor section 21 are static, fixed angle, or otherwise stationary airfoils. Such other vanes 118 may include an inlet guide vane 114 positioned at an upstream end 98 of the compressor section 21. Additionally, or alternatively, one or more stages of vanes 118 positioned downstream of the inlet guide vane 114 may be formed as fixed airfoils of the compressor section 21, such as to form inter-stage vanes 116 of the first compressor 22. In still various embodiments, all vanes 118 of the compressor section 21 are formed as fixed airfoils, such as fixed pitch axis, fixed angle, or other non-rotating airfoils.

Referring to FIGS. 2-3, the vane 110 including the opening 112 described herein may be positioned in a downstream-most end of the first compressor 22 relative to the flow of fluid therethrough. In other words, the vane 110 is positioned downstream of the plurality of blades 122 of the first compressor 22.

In other embodiments, such as depicted in FIG. 4, the vane 110 is positioned at the upstream-most end of the first compressor 22 as the inlet guide vane 114. In other words, the vane 110 is positioned upstream of the plurality of blades 122 of the first compressor 22.

In certain embodiments, such as depicted in FIG. 5, an aperture 113 is positioned downstream of the first compressor 22 and upstream of the second compressor 24. The aperture 113 is configured to provide a second portion of the fluid, depicted schematically by arrows 74, from the aperture 113 and to the opening 112 at the vane 110. The flows 74 and 71 are mixed and provided to the flowpath 70 via the opening 112 at the vane 110. In certain embodiments, the aperture 113 may allow for increased control or variability of flows, exit angle, or pressure of fluid egressed through the opening 112.

In still other embodiments, such as depicted in FIG. 6, the vane 110 is positioned at one or more of the stators or inter-stage vanes 116 positioned between the upstream-most end and the downstream-most end of the first compressor 22. In other words, the vane 110 is positioned between the downstream end 99 of the first compressor 22 and the upstream end 98 of the first compressor 22.

It should be appreciated that in still other embodiments, the compressor section 21 may include combinations of placements of the vane 110 depicted and described in regard to FIGS. 2-6.

Referring now to FIGS. 7-8, perspective views of embodiments of the vane 110 of the compressor section 21 described herein are provided. Referring also to FIG. 9, an exemplary cross-sectional view of the vane 110 is provided. The vane 110 includes a leading edge 131 and a trailing edge 132, a reference chord line 134, a span-wise height 136, and a reference camber line 137 (FIG. 9). The vane 110 further includes a maximum airfoil thickness location 135. The vane 110 further includes a pressure side, a suction side, and other airfoil characteristics for desirably flowing fluid across the vane 110.

Referring back to FIGS. 2-6, and further in regard to FIGS. 7-9, in certain embodiments, the opening 112 at the vane 110 of the first compressor 22 is positioned between the maximum thickness location 135 at the vane 110 and 8% of the chord 134 from the trailing edge 132 of the vane 110. In another embodiment, the opening 112 at the vane 110 is positioned between a maximum thickness location at the vane 110 and 10% of the chord 134 from the trailing edge 132. In still another embodiment, the opening 112 at the vane 110 is positioned between a maximum thickness location at the vane 110 and 12% of the chord 134 from the trailing edge 132. It should be appreciated that the maximum thickness location 135 may be measured or defined relative to the chord line 134 or the camber line 137, and the maximum thickness location used herein refers to a location more proximate to the leading edge 131. It should further be appreciated that the distance from the trailing edge 132 relative to positioning of the opening 112 may be defined relative to along the camber line 137. Furthermore, one skilled in the art will understand how a distance from the trailing edge 132 relative to the chord line 134 may be converted to or from a distance from the trailing edge 132 relative to the chamber line 137.

In still various embodiments, the opening 112 may be positioned at the pressure side, the suction, or both, of the vane 110. Of the plurality of vanes 110, certain individual vanes 110 may include the opening 112 positioned at the pressure side and other vanes within an axial stage may include the opening 112 positioned at the suction side. In still other embodiments, one or more axial stages of the vanes 110 may include the opening 112 positioned on the pressure side and one or more other axial stages of the vanes 110 may include the opening 112 positioned on the suction side.

It should be appreciated that the opening 112 is positioned within the ranges provided such as to desirably inject fluid 73 from the second compressor 24 into the flowpath 70 at the first compressor 22 to modify average flow angle across span-wise height 136 of the vane 110. Modifying the average flow angle across the span-wise height 136 of the vane 110 allows or modifying the vane exit angle of fluid without the use of kinematic hardware or physical turning of the vane 118. As such, the opening 112 positioned within the ranges provided herein may remove the need for kinematic hardware typically used for improving operability and/or performance at the compressor section 21, such as to save weight, reduce complexity, and/or improve compressor operability across all, or substantially all, of the operating envelop of the compressor section 21. Additionally, or alternatively, placement of the opening 112 within the ranges provided herein may particularly provide one or more benefits described herein in contrast to other placements of ports or openings outside of the disclosed ranges.

Referring now to FIG. 8, in certain embodiments, the vane 110 includes a plurality of the opening 112. The plurality of the opening 112 includes a first opening 141 forming a different cross-sectional area from a second opening 142. In various embodiments, the first opening 141 and the second opening 142 are each positioned at different span-wise 136 locations relative to one another along the vane 110. In still various embodiments, the first opening 141 forms a greater cross-sectional area that the second opening 142. In particular embodiments, the greater cross-sectional area corresponds to a greater exit width of the opening 112. In one embodiment, the second opening 142 is positioned proximate to an inner diameter 143 of the vane 110 relative to the first opening 141. In another embodiment, the second opening 142 is positioned proximate to an outer diameter 144 of the vane 110 relative to the first opening 141.

In yet another embodiment, the second opening 142 is positioned proximate to the inner diameter 143 and the outer diameter 144 of the vane 110 relative to the first opening 141. As such, a relatively middle span of the vane 110 includes the first opening 141 forming a first exit width 145 greater than a second exit width 146 at the second opening 142. It should be appreciated that the vane 110 may include one or more third cross-sectional areas or exit widths greater than the second opening 142 and less than the first opening 141. The particular positioning and relative size of the first opening 141 versus the second opening 142 may allow for improved compressor matching. Additionally, or alternatively, the particular position and relative size of the first opening 141 versus the second opening 142 may mitigate flow disturbances, flow asymmetry, turbulence, or other undesired flow characteristics as the fluid 73 re-enters the flowpath 70 through the opening 112 at the vane 110.

Referring back to FIGS. 2-6, in various embodiments, the engine 10 may include a conduit 120 extended from the port 111 at the second compressor 24 to the vane 110 at the first compressor 22. The conduit 120 provides fluid communication from the flowpath 70 at or aft of the downstream end 99 of the second compressor 24 to the opening 112 at the vane 110. A conduit flowpath 125 is defined from the port 111 to the opening 112 to provide the flow of fluid 71 from the second compressor 24 to the flowpath 70 at or downstream of the first compressor 22.

In one embodiment, such as depicted in FIG. 3, a valve 130 is positioned at the conduit 120. The valve 130 is configured to modulate pressure and/or flow of the portion of fluid 71 from the port 111 at the second compressor 24 to the opening 112 at the first compressor 22. In various embodiments, the valve 130 is any appropriate valve or device for controlling, articulating, restricting, or increasing flow rate or pressure of fluid removed from the flowpath 70 at the second compressor 24 and/or re-introduced to the flowpath 70 at the first compressor 22. Suitable valves include, but are not limited to, butterfly valves, ball valves, gate valves, plug valves, or other appropriate valve types.

In another embodiment, such as depicted in FIG. 5, the conduit 120 is extended from the aperture 113 to provide flow communication from the aperture 113 to the opening 112 at the vane 110. The flow 71 from the port 111 and flow 74 from the aperture 113 is allowed to mix at the conduit flowpath 125 and provides the mixed flow to the flowpath 70 via the opening 112 at the vane 110. In certain embodiments, the valve 130 is positioned at a junction between the aperture 113 and the port 111 to control an amount or ratio of fluid received from the respective port 111 and aperture 113. The valve 130 may be configured to discontinue flow or extraction from one or both of the port 111 or the aperture 113.

Referring back to FIG. 1, certain embodiments of the engine 10 include a controller 210 configured to execute operations. The operations include rotating the first compressor 22 and the second compressor 24 to generate a compressed fluid 72 therethrough, such as described herein. In some embodiments, rotating the first compressor 22 and the second compressor 24 include rotating the compressors at the same rotational speed. In a particular embodiment, rotating the first compressor 22 and the second compressor 24 is at the same rotational speed via a commonly rotatable shaft. However, in other embodiments, the first compressor and the second compressor are separately rotatable.

The operations further include removing, via the port 111, at least a portion of the fluid from the flowpath 70 at the second compressor 24. The operations furthermore include adjusting an operation line at the first compressor 22 based at least on egressing at least a portion of the portion of fluid from the second compressor 24 through the vane 110 at the first compressor 22, such as described herein.

In various embodiments, the operations include modifying a work-split between the first compressor 22 and the second compressor 24. Work or work-split between the compressors 22, 24 generally refers to a magnitude of pressurization of the fluid therethrough performed by each respective compressor 22, 24. The work at a respective compressor 22, 24 or the work-split between the compressors 22, 24 may refer to enthalpy use between the compressors 22, 24. In certain embodiments, modifying the work-split between the first compressor 22 and the second compressor 24 is based at least on removing the portion of the fluid 71 from the flowpath 70 at the second compressor 24. In still certain embodiments, modifying the work-split between the first compressor 22 and the second compressor 24 is based at least on decreasing the operation line at the first compressor 22.

In some embodiments, the operations include decreasing the operation line at the first compressor 22 based at least on increasing loading at the second compressor 24 and removing at the portion of fluid 71 from the flowpath 70 at the second compressor 24. In one embodiment, the operations include increasing stall margin at the first compressor 22 based at least on decreasing the operation line at the first compressor 22, such as described above.

In still various embodiments, adjusting the operation line at the first compressor 22 includes maintaining a constant vane angle at a plurality of stages of stators or stationary airfoil vanes 118, such as described herein. In one embodiment, adjusting the operation line at the first compressor 22 includes increasing rotational speed at the first compressor 22.

In certain embodiments, the operations include removing, via the aperture 113, at least a second portion of the fluid from the flowpath 70 between the first compressor 22 and the second compressor 24. The operations may further include egressing the portion of fluid from the port 111 and the portion of fluid from the aperture 113 through the vane 110 at the first compressor 22.

Referring still to FIG. 1, in general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 can include control logic 216 stored in memory 214. The control logic 216 may include instructions that when executed by the one or more processors 212 cause the one or more processors 212 to perform operations, such as described above.

Additionally, as shown in FIG. 1, the controller 210 can also include a communications interface module 230. In several embodiments, the communications interface module 230 can include associated electronic circuitry that is used to send and receive data. As such, the communications interface module 230 of the controller 210 can be used to send and/or receive data to/from engine 10 and the compressor section 21. In addition, the communications interface module 230 can also be used to communicate with any other suitable components of the engine 10, including any number of valves 130, sensors, flow control devices, or other actuatable structures.

It should be appreciated that the communications interface module 230 can be any combination of suitable wired and/or wireless communications interfaces and, thus, can be communicatively coupled to one or more components of the compressor section 21 or the engine 10 via a wired and/or wireless connection. As such, the controller 210 may obtain, determine, store, generate, transmit, or operate any one or more steps of the operations such as described herein, or an apparatus to which the engine 10 is attached. Such apparatuses may include, but are not limited to, fixed- or rotary-wing aircraft, seacraft, or ground, air, or satellite-based vehicles, in communication with the compressor section 21 and/or engine 10 (e.g., a distributed network).

One or more components of the engine 10 or compressor section 21 described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein allow for the manufacture of the opening 112 at the vane 110, the port 111 at the second compressor 24, the conduit 120 therebetween, or combinations thereof, as monolithic structures with desired cross-sectional areas, volumes, or other geometries described herein to provide desired compressor matching between the first compressor 22 and the second compressor 24, Such structures, or development and employment of methods, may not have been possible or practical using prior manufacturing methods. Additionally, such structures may not have been possible or practical using prior manufacturing methods while allowing for reduced weight relative to variable vane architectures.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine, wherein the turbomachine defines a flowpath therethrough at which a fluid is compressed, the turbomachine comprising a first compressor in serial flow arrangement upstream of a second compressor, wherein the second compressor comprises a port at the flowpath, wherein the port at the second compressor is configured to receive at least a portion of the fluid from the flowpath from the second compressor, and wherein the first compressor comprises a vane positioned at the flowpath, and wherein the vane comprises an opening at the flowpath, wherein the opening at the vane is configured to egress the portion of the fluid from the port into the flowpath.

2. The turbomachine of any clause herein, wherein the port at the second compressor is positioned at or aft of a downstream end of the second compressor.

3. The turbomachine of any clause herein, wherein the opening at the vane of the first compressor is positioned between a maximum thickness location at the vane and 10% of a chord from a trailing edge of the vane.

4. The turbomachine of any clause herein, the turbomachine comprising a conduit extended from the port at the second compressor to the vane at the first compressor, wherein the conduit provides fluid communication from the flowpath at the downstream end of the second compressor, or aft thereof, to the opening at the vane.

5. The turbomachine of any clause herein, wherein the vane comprises a plurality of the opening comprising a first opening forming a different cross-sectional area from a second opening.

6. The turbomachine of any clause herein, wherein the first opening and the second opening are positioned at different span-wise locations relative to one another along the vane.

7. The turbomachine of any clause herein, wherein the first opening comprises a greater cross-sectional area than the second opening, and wherein the second opening is positioned proximate to an inner diameter of the vane, an outer diameter of the vane, or both, relative to the first opening.

8. The turbomachine of any clause herein, wherein the vane comprises a plurality of the opening comprising a first opening forming a first exit width greater than a second exit width at a second opening, and wherein the second opening is positioned proximate to an inner diameter of the vane, an outer diameter of the vane, or both, relative to the first opening.

9. The turbomachine of any clause herein, wherein the vane is positioned downstream of a plurality of blade of the first compressor.

10. The turbomachine of any clause herein, wherein the vane is positioned upstream of a plurality of blades of the first compressor.

11. The turbomachine of any clause herein, wherein the vane is positioned between a downstream end of the first compressor and an upstream end of the first compressor.

12. The turbomachine of any clause herein, wherein the first compressor comprises a plurality of stages of stationary vanes, and wherein the plurality of stages of stationary vanes consist of fixed pitch angle airfoils.

13. The turbomachine of any clause herein, wherein the first compressor is an axial compressor.

14. The turbomachine of any clause herein, wherein the second compressor is a centrifugal compressor.

15. The turbomachine of any clause herein, the turbomachine comprising a conduit extended from the port at the second compressor to the vane at the first compressor, wherein the conduit provides fluid communication from the flowpath at a downstream end of the second compressor, or aft thereof, to the opening at the vane; and a valve is positioned at the conduit, wherein the valve is configured to modulate pressure and/or flow of the portion of fluid from the port at the second compressor to the opening at the first compressor.

16. The turbomachine of any clause herein, the turbomachine comprising an aperture positioned downstream of the first compressor and upstream of the second compressor, wherein the aperture is configured to provide a second portion of the fluid from the aperture into the flowpath via the opening at the vane.

17. The turbomachine of any clause herein, wherein the conduit is extended from the aperture to provide flow communication of fluid from the aperture to the opening at the vane.

18. The turbomachine of any clause herein, wherein the valve is configured to control a ratio to the conduit flowpath of fluid from the aperture versus fluid from the port.

19. The turbomachine of any clause herein, the turbomachine comprising a controller configured to execute operations, the operations comprising rotating the first compressor and the second compressor to generate a compressed fluid therethrough; removing, via the port, at least a portion of the fluid from the flowpath at the second compressor; and adjusting an operation line at the first compressor based at least on egressing at least a portion of the portion of fluid from the second compressor through the vane at the first compressor.

20. The turbomachine of any clause herein, the operations comprising modifying a work-split between the first compressor and the second compressor based at least on removing the portion of the fluid from the flowpath at the second compressor.

21. The turbomachine of any clause herein, the operations comprising increasing stall margin at the first compressor based at least on increasing work at the second compressor.

22. The turbomachine of any clause herein, wherein adjusting the operation line at the first compressor comprises maintaining a constant vane angle at a plurality of stages of static airfoils.

23. The turbomachine of any clause herein, wherein adjusting the operation line at the first compressor comprises increasing rotational speed at the first compressor.

24. The turbomachine of any clause herein, wherein modifying the work-split between the first compressor and the second compressor is based at least on decreasing the operation line at the first compressor.

25. The turbomachine of any clause herein, the operations comprising removing, via an aperture positioned downstream of the first compressor and upstream of the second compressor, at least a portion of the fluid from the flowpath.

26. The turbomachine of any clause herein, the operations comprising adjusting the operation line at the first compressor based at least on egressing through the vane at the first compressor at least a portion of the portion of fluid from the aperture.

27. The turbomachine of any clause herein, wherein the turbomachine is a turboprop or turboshaft engine configuration.

What is claimed is:

1. A turbomachine, wherein the turbomachine defines a flowpath therethrough at which a fluid is compressed, the turbomachine comprising:
    a first compressor in serial flow arrangement upstream of a second compressor;
    wherein the second compressor comprises a port at the flowpath, wherein the port at the second compressor is configured to receive at least a portion of the fluid from the flowpath from the second compressor;
    wherein the first compressor comprises a vane positioned at the flowpath, and wherein the vane comprises an opening at the flowpath, wherein the opening at the vane is configured to egress the portion of the fluid from the port into the flowpath:
    at least one controller configured to execute operations, the operations comprising;
        rotating the first compressor and the second compressor to generate a compressed fluid therethrough;
        removing, via the port, at least a portion of the fluid from the flowpath at the second compressor; and
        adjusting an operation line at the first compressor based at least on egressing at least a portion of the portion of fluid from the second compressor through the vane at the first compressor.

2. The turbomachine of claim 1, wherein the port at the second compressor is positioned at or aft of a downstream end of the second compressor.

3. The turbomachine of claim 1, wherein the opening at the vane of the first compressor is positioned between a maximum thickness location at the vane and 10% of a chord from a trailing edge of the vane.

4. The turbomachine of claim 1, the turbomachine comprising:
    a conduit extended from the port at the second compressor to the vane at the first compressor, wherein the conduit provides fluid communication from the flowpath at a downstream end of the second compressor, or aft thereof, to the opening at the vane.

5. The turbomachine of claim 1, wherein the vane opening comprises a plurality of the opening comprising a first opening forming a different cross-sectional area from a second opening.

6. The turbomachine of claim 5, wherein the first opening and the second opening are positioned at different span-wise locations relative to one another along the vane.

7. The turbomachine of claim 6, wherein the first opening comprises a greater cross-sectional area than the second opening, and wherein the second opening is positioned proximate to an inner diameter of the vane or an outer diameter of the vane, relative to the first opening.

8. The turbomachine of claim 1, wherein the vane comprises a plurality of the opening comprising a first opening forming a first exit width greater than a second exit width at a second opening, and wherein the second opening is positioned proximate to an inner diameter of the vane or an outer diameter of the vane, relative to the first opening.

9. The turbomachine of claim 1, wherein the vane is positioned downstream of a plurality of blades of the first compressor.

10. The turbomachine of claim 1, wherein the vane is positioned upstream of a plurality of blades of the first compressor.

11. The turbomachine of claim 1, wherein the vane is positioned between a downstream end of the first compressor and an upstream end of the first compressor.

12. The turbomachine of claim 1, wherein the first compressor comprises a plurality of stages of stationary vanes, and wherein the plurality of stages of stationary vanes consist of fixed pitch angle airfoils.

13. The turbomachine of claim 1, wherein the first compressor is an axial compressor.

14. The turbomachine of claim 13, wherein the second compressor is a centrifugal compressor.

15. The turbomachine of claim 1, the turbomachine comprising:
a conduit extended from the port at the second compressor to the vane at the first compressor, wherein the conduit provides fluid communication from the flowpath at a downstream end of the second compressor, or aft thereof, to the opening at the vane; and
a variable flow restrictor is positioned at the conduit, wherein the variable flow restrictor is configured to modulate pressure and/or flow of the portion of fluid from the port at the second compressor to the opening at the first compressor.

16. The turbomachine of claim 1, the turbomachine comprising:
an aperture positioned downstream of the first compressor and upstream of the second compressor, wherein the aperture is configured to provide a second portion of the fluid from the aperture into the flowpath via the opening at the vane.

17. The turbomachine of claim 1, the operations comprising:
modifying a work-split between the first compressor and the second compressor based at least on removing the portion of the fluid from the flowpath at the second compressor.

18. The turbomachine of claim 17, the operations comprising:
increasing stall margin at the first compressor based at least on increasing work at the second compressor.

19. The turbomachine of claim 1, wherein adjusting the operation line at the first compressor comprises maintaining a constant vane angle at a plurality of stages of static airfoils.

\* \* \* \* \*